United States Patent
Romero et al.

Patent Number: 6,020,084
Date of Patent: Feb. 1, 2000

[54] ELECTROCHEMICAL CELL DESIGN WITH A HOLLOW CORE

[75] Inventors: Antonio Romero, Parkton; Salah Oweis, Ellicott City; Guy Chagnon, Columbia; Robert Staniewicz, Hunt Valley; Douglas Briscoe, Westminster, all of Md.

[73] Assignee: Alcatel, Paris, France

[21] Appl. No.: 09/024,249

[22] Filed: Feb. 17, 1998

[51] Int. Cl.$^7$ ................................................. H01M 6/10
[52] U.S. Cl. .............................................. 429/94; 429/208
[58] Field of Search ....................... 429/94, 53, 54, 429/55, 56, 175, 176, 167, 211, 208

[56] References Cited

U.S. PATENT DOCUMENTS

| | | | |
|---|---|---|---|
| 3,373,060 | 3/1968 | Gray | 136/100 |
| 3,490,949 | 1/1970 | Deschamps . | |
| 3,503,806 | 3/1970 | Sugalski | 136/13 |
| 3,682,706 | 8/1972 | Yardney . | |
| 4,262,064 | 4/1981 | Nagle . | |
| 4,663,247 | 5/1987 | Smilanich et al. | 429/94 |
| 5,021,306 | 6/1991 | Sauer et al. | 429/94 |
| 5,183,222 | 2/1993 | Ramsey, Jr. . | |
| 5,288,564 | 2/1994 | Klein et al. . | |
| 5,501,916 | 3/1996 | Teramoto et al. | 429/94 |
| 5,660,942 | 8/1997 | Kothari | 429/54 |

FOREIGN PATENT DOCUMENTS 0 044 753 A1  1/1982  European Pat. Off. .

*Primary Examiner*—Maria Nuzzolillo
*Assistant Examiner*—Carol Chaney
*Attorney, Agent, or Firm*—Sughrue, Mion, Zinn, Macpeak & Seas, PLLC

[57] ABSTRACT

An electrochemical cell having a spiral winding around a central core, wherein the central core is provided with longitudinal grooves on its outer surface to facilitate electrolyte filing and accommodate overpressure. The core itself improves dissipation of heat generated along the center of the cell, and the hollow core design allows the cell core to have a larger radius, permitting the "jelly roll" winding to begin at a larger radius and thereby facilitate the initial turns of the winding by decreasing the amount of bending required of the electrode laminate at the beginning of the winding operation. The hollow core also provides mechanical support end-to-end. A pair of washers are used at each end of the cell to sandwich current collection tabs in a manner that improves electrical and thermal conductivity while also providing structural integrity.

6 Claims, 4 Drawing Sheets

ELECTROCHEMICAL CELL DESIGN WITH A HOLLOW CORE

BACKGROUND OF THE INVENTION

The present invention relates to electrochemical cells, and more particularly to spirally wound cells wherein the electrodes and electrolyte are wound around a cylindrical core. The invention is more particularly directed to an improved core structure for such cells. The invention is particularly applicable to spirally wound secondary cells.

In a typical spirally wound cell, a "jelly roll" of the anode, cathode and separator is wound onto a solid core. The anode and cathode are offset with respect to one another in the axial direction of the core, so that the anode electrode extends by itself from one end of the winding and the cathode electrode extends from the other. After the winding is complete, it is placed in a "can" which forms the outer cover of the battery. A liquid electrolyte is then injected to fill the interior of the can, including the space occupied by the porous separator. The can is then sealed and is ready for operation.

Most battery structures of this type include a solid core, and a drawback of such a structure is that heat generated during operation of the cell, particularly during overcharging, is not dissipated very well from the inner part of the cell. Post mortem analysis on failed batteries show heat spots, signs of burning and electrode damage at the core area of the cell. Another drawback is that the cylindrical core is typically of a relatively small diameter and this makes the beginning of winding difficult, particularly if it is desired to use thick electrodes.

A further problem with prior art rechargeable batteries, particularly Li-Ion batteries, is that during overcharging there may be an excessive pressure build-up and to address this it is common to use a pressure release vent designed to rupture at some predetermined pressure. However, due to mechanical instability of the cell casing, it may be that the casing around the vent deforms under pressure and the rupture pressure of the vent may then become unpredictable. It would therefore be desirable to enhance the mechanical stability of the cell casing.

U.S. Pat. No. 3,490,949 discloses "ring-shaped" battery, where, instead of a solid core of relatively small diameter, the structure employs a larger diameter hollow core. The hollow core provides for improved heat dissipation, and at the same time the larger diameter of the core makes winding easier.

A further example of a hollow core battery structure is found in published European Patent Application 0 620 610 A1, wherein further heat dissipation improvements are provided by way of fins extending axially within the hollow core and/or radial heat dissipating fins on the battery lid.

Neither of the cell structures disclosed in the above-cited references addresses the problem of electrolyte filling, the problem of cell pressure release, e.g., during severe overcharging, or the mechanical support given by the hollow core to the cell structure.

SUMMARY OF THE INVENTION

Accordingly, it is an object of the present invention to provide an electrochemical cell structure which provides for improved electrolyte filling and improved pressure release, as well as mechanical support end-to-end given by the hollow core.

It is a further object of the invention to provide such an improved cell structure while preserving and enhancing the advantageous heat dissipation characteristics which characterize a hollow-core battery.

These and other objects of the invention are achieved by improved cell in which the central core is provided with longitudinal grooves on its outer surface. During electrolyte filing, the electrolyte can migrate up the grooves more easily than through the porous separator, thereby filling the cell faster. In addition, gas being expelled from the interior of the can migrate up the grooves, allowing the electrolyte to fill with less back pressure. Finally, during overpressure situations, the electrolyte is forced up the grooves and expelled through the pressure release valve at one end of the cell structure, thereby permitting the release of pressure, and reducing the risk of explosion, to a much greater extent than if there were no escape path for the electrolyte. The hollow core design improves the dissipation of heat generated along the center of the cell, allowing faster, more efficient cooling of the central part of the cell while also allowing better temperature distribution inside the cell. Also, the hollow core design allows the cell core to have a larger radius, permitting the "jelly roll" winding to begin at a larger radius and thereby facilitating the initial turns of the winding by decreasing the amount of bending required of the electrode laminate at the beginning of the winding operation. The hollow core also provides mechanical support end-to-end.

The use of a pair of washers at each end of the cell winding assembly secures the current collection tabs in a manner that provides improved current collection and structural integrity while also enhancing heat dissipation.

BRIEF DESCRIPTION OF THE DRAWINGS

The invention will be more clearly understood from the following description in conjunction with the accompanying drawings, wherein.

DETAILED DESCRIPTION OF THE INVENTION

Figure 1:
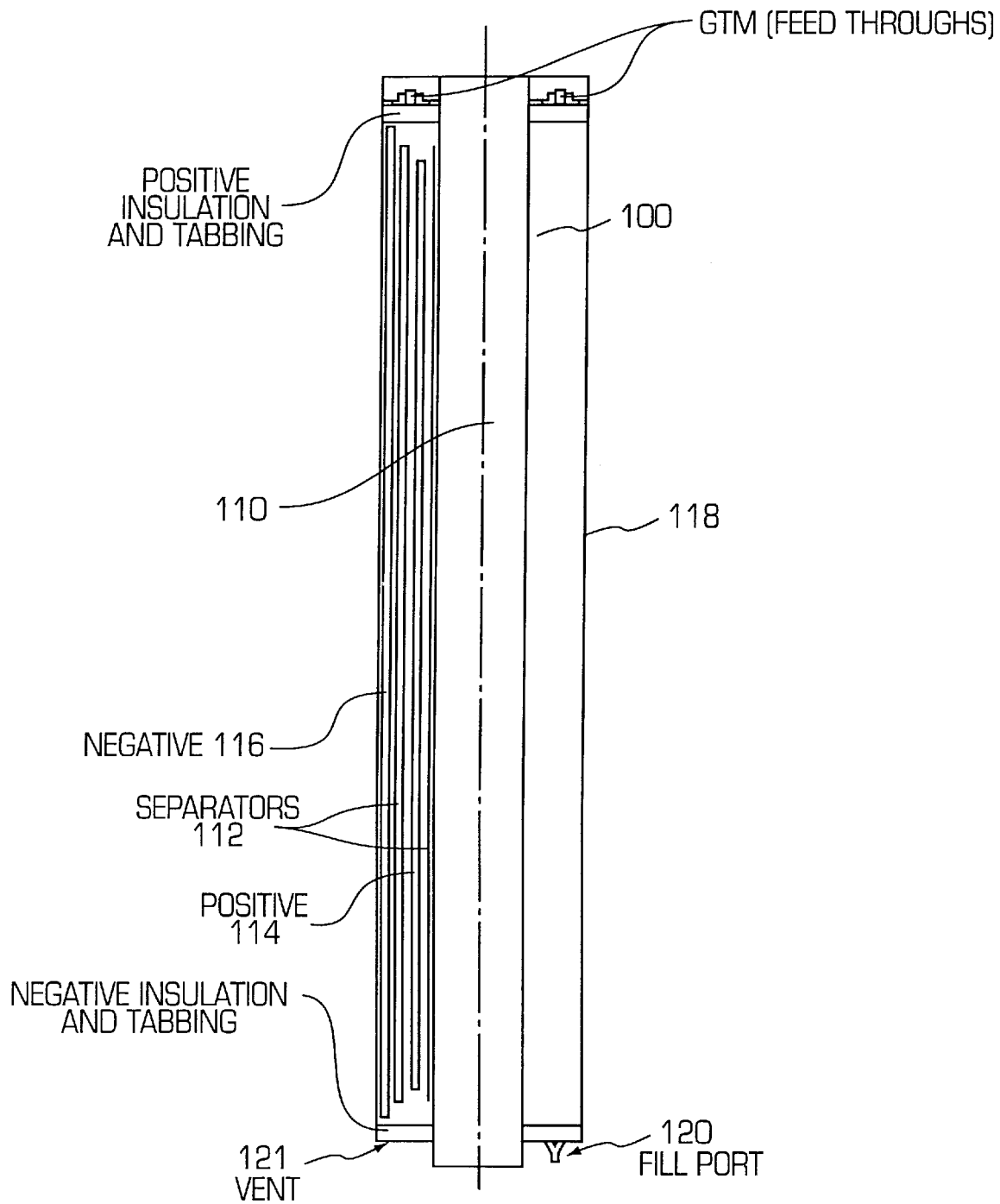
FIG. 1 is a sectional view of a hollow core cell structure in accordance with the present invention.

The hollow core cell structure according to the invention is generally illustrated in FIG. 1. It is described in the context of a high power Li-Ion cell, although this is by way of example only and the structure is applicable to other electrochemical cells as well.

The core 100 is in the form of a thin-walled hollow tube with an internal longitudinal aperture 110. A separators 112 are disposed on either side of a positive electrode 114, and a composite formed of these and a negative electrode 116 is wound onto the exterior of the core. The wound structure is placed in a can 118 and the ends of the core are hermetically welded to the top and bottom covers of the cell. The positive electrode is electrically coupled to one end of the container and insulated from the other, and similarly the negative electrode. A fill port 120 is provided at one end of the container for the introduction of the electrolyte. Also included at the lower end of the container is a vent 121, designed to rupture at a pressure of, e.g., 185 psi. The dimensions will vary with cell designs.

Figure 2A:
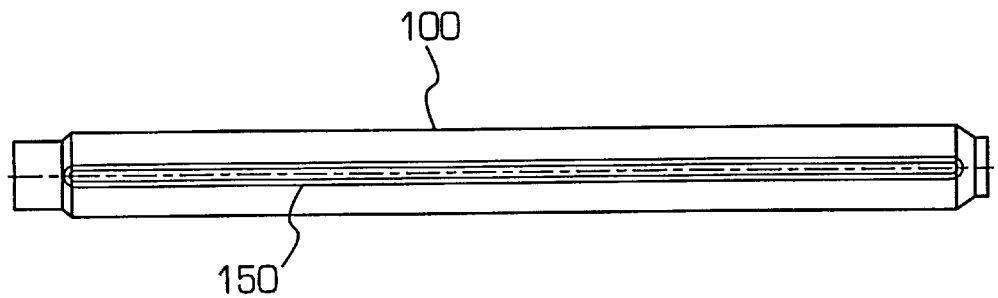
FIGS. 2A–2C are side, end and enlarged views, respectively, showing the structure of a core according to the present invention.
Figure 2B:
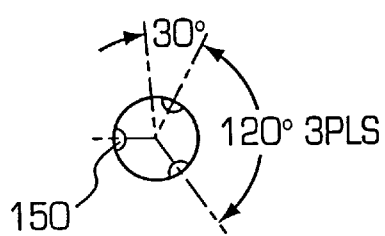
Figure 2C:
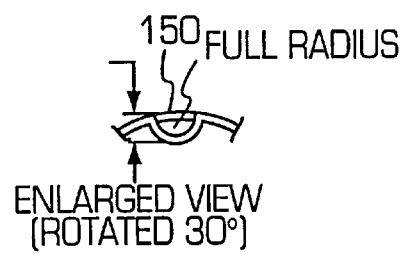

As shown in FIGS. 2A–2C, the core 100 is in the form of a tube provided with a plurality of grooves 150 running along its exterior. In the example shown in FIGS. 2A–2C, there are three grooves provided, spaced at 120° intervals around the periphery of the core, with each groove being in the form of a full radius, i.e., a semi-circle. It will be understood, however, that the number, configuration, size and length of the grooves, as well as the inner and outer diameters of the hollow tube, are selected according to winding, thermal, mechanical and fabrication considerations of the cell.

Figure 3:
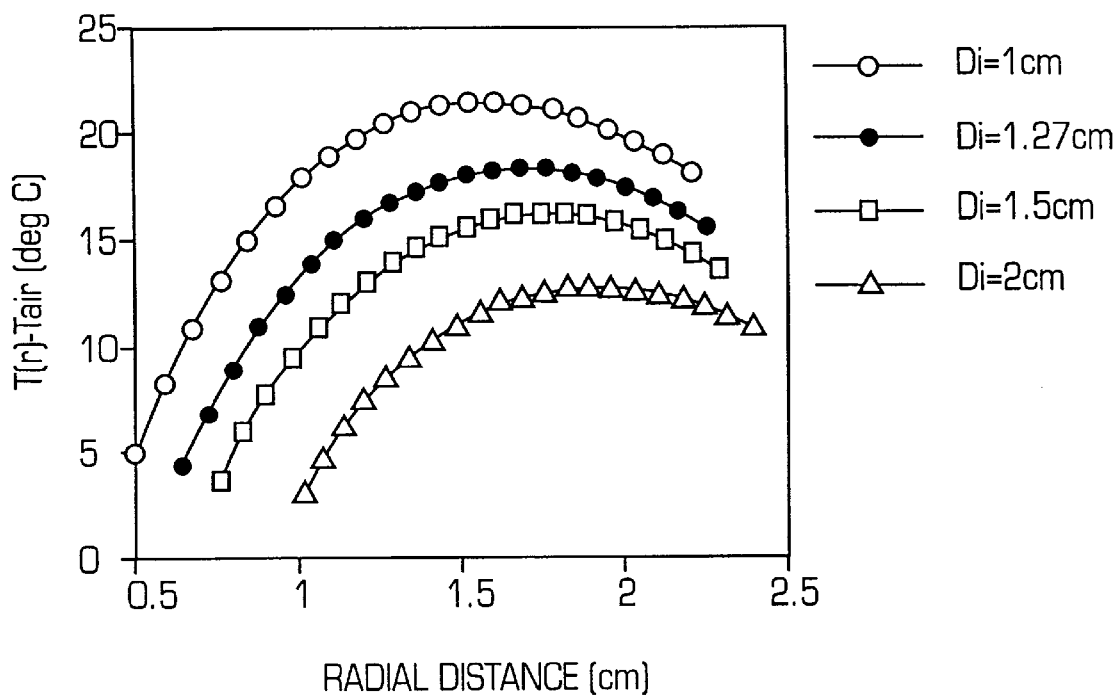
FIG. 3 is a graph illustrating the improved temperature distribution obtained with a cell structure according to the present invention.

FIG. 3 is a graph showing the effect of variations of inside diameter of the core on the temperature distribution within the cell. Note that, for a fixed electrode winding length (and therefore a constant cell capacity), a given increase in the outer diameter of the core will lead to a corresponding, but smaller, increase in the outer diameter of the winding. The temperature of the winding will then be lower due to (1) larger heat-dissipating areas at the inner and outer diameters of the winding, and (2) the ability of the hollow core to conduct away the heat generated at the interior of the winding.

Figure 4:
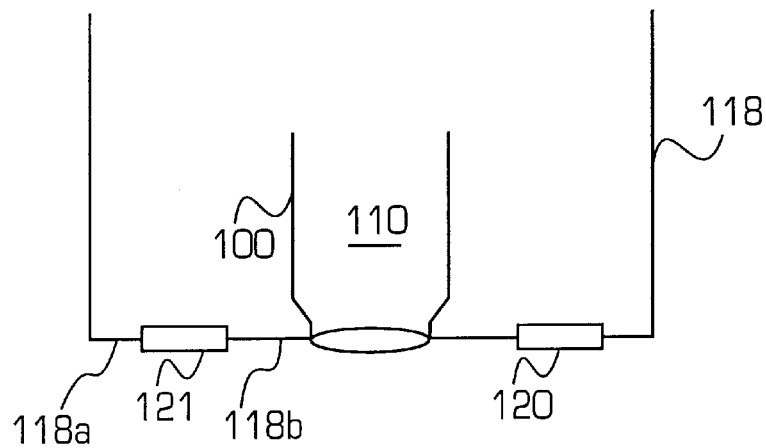
FIG. 4 is an enlarged view of one end of a cell constructed in accordance with the present invention.

FIG. 4 is an expanded view of the structure at one end of the container in a cell constructed in accordance with the present invention. As described above with reference to FIG. 2, one end of the container may include a fill port and vent. The vent will typically be designed to rupture at some predetermined pressure, but if the end face of the container in the regions 118a and 118b should deform under pressure, this may result in added stress on the vent member that could will cause that member to rupture at a pressure different from the designed rupture pressure. To address this problem, the core 110 is secured to the end faces of the container by welding or other suitable means. The core then serves as a structural member which can prevent deformation of the end face of the container in the vicinity of the vent.

Figure 5:
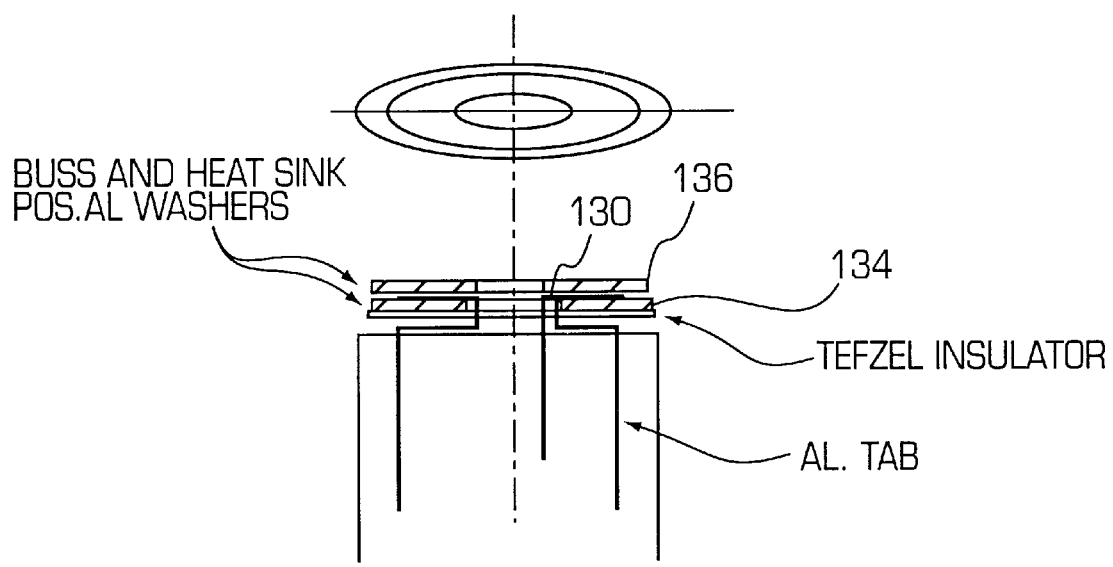
FIG. 5 is a side sectional view of a cell constructed in accordance with the present invention.

FIG. 5 illustrates one end of a cell structure for explaining yet another improvement according to the present invention. The hollow core 110 is not shown in FIG. 5, for ease of illustration and explanation. The cell is wound so that all of the positive tabs 130 are at the top of the cell and all of the negative tabs at the bottom (not shown). An insulator 132 is then placed over the end of the winding, and a buss washer 134 is then placed on the insulator. The tabs are passed through aligned apertures in the insulator and buss washer, and are then folded over the buss washer to extend radially outwardly. The tabs are then welded to the buss washer. A heat sink washer 136, again with a central aperture, is placed over the tabs and is welded to the buss washer 134. The winding assembly is then placed in a container (not shown). It has been found that the sandwiching of the current collection tabs between the washers provides improved current collection, heat sinking and structural integrity, all at the same time.

In a cell constructed in accordance with the present invention, the central aperture of the hollow core design improves the dissipation of heat generated within the cell, and the larger diameter of the core facilitates the initial winding, reduces the "cracking" of the coated layers on electrodes of the jelly roll, and reduces the thickness of the winding assembly and thereby further reduces the heat build-up in the cell. Longitudinal grooves on the outer surface of the core can then be used to help properly evacuate and fill the cell during the electrolyte filling process. The grooves will also facilitate venting during overcharging, providing a path for gas to migrate to the vent. The core also adds to the mechanical support end-to-end of the cell. Finally, the buss/heat sink washer sandwiching arrangement at the ends of the cell further enhances the structural, thermal and electrical characteristics of the cell.

It will be appreciated that various changes and modifications can be made to the disclosed embodiments without departing from the spirit and scope of the invention as defined in the appended claims.

We claim:

1. An electrochemical cell comprising an assembly of a central core and a spiral winding of electrodes on an outer surface of said central core, said core having at least one groove formed in said outer surface and running in an axial direction of said core, said at least one groove defining an open duct through which electrolyte flows during filling and evacuation.

2. A cell according to claim 1, wherein said groove extends substantially the entire length of a portion of the core on which said electrodes are wound.

3. A cell according to claim 1, wherein there are a plurality of grooves on said outer surface.

4. A cell according to claim 1, further comprising a container enclosing said assembly, and a vent member disposed in one end of said container, said central core being secured to said end of said container to provide structural integrity and substantially prevent deformation of said end under pressure.

5. A cell according to claim 1, further comprising an insulating member disposed over one end of said winding, a first washer disposed over said insulator, each of said insulator and first washer including a central aperture, current collection tabs coupled to electrodes of one polarity and extending through said aperture and folded over said first washer to extend in a radially outward direction, and a second washer disposed over said first washer and sandwiching said current collection tabs between said first and second washers, said second washer being secured to said first washer.

6. A cell according to claim 5, wherein said second washer is welded to said first washer.

\* \* \* \* \*